United States Patent

[11] 3,561,310

| [72] | Inventors | Lawrence M. Deeks<br>Westlake, Ohio;<br>Edward J. Kleber, Jr., Niagara Falls, N.Y. |
|---|---|---|
| [21] | Appl. No. | 666,632 |
| [22] | Filed | Sept. 11, 1967 |
| [45] | Patented | Feb. 9, 1971 |
| [73] | Assignee | Union Carbide Corporation<br>a corporation of New York |

[54] CUTTING AND FORMING APPARATUS
6 Claims, 3 Drawing Figs.

[52] U.S. Cl. .................................................. 83/201.15,
125/21; 143/26; 144/134
[51] Int. Cl. .................................................. B26d 1/54
[50] Field of Search.......................................... 83/201,
201.04, 201.15; 143/17, 26, 3, 160, 44, 19;
144/134.7, 167, 2—11; 125/21

[56] References Cited
UNITED STATES PATENTS

| 729,915 | 6/1903 | Beecher .................... | 83/201X |
| 2,962,752 | 12/1960 | Massengill ................ | 83/201.15X |
| 3,026,753 | 3/1962 | Schulpen .................. | 83/201.15X |
| 3,456,555 | 7/1969 | Dunlap ..................... | 90/12 |
| 2,809,680 | 1957 | Nethery, Jr. et al. ........ | 143/32X |

Primary Examiner—Andrew R. Juhasz
Assistant Examiner—James F. Coan
Attorneys—Paul A. Rose, Robert C. Cummings and Frederick J. McCarthy, Jr.

ABSTRACT: An apparatus for cutting material into shaped articles which includes a bandsaw and a guide member, the latter being constructed so as to enclose at least a part of the bandsaw to provide a passageway therefor. The guide member may be formed into various shapes thereby causing the bandsaw to be similarly shaped and to thus impart this shape to the article being cut.

PATENTED FEB 9 1971

3,561,310

INVENTORS
LAWRENCE M. DEEKS
EDWARD J. KLEBER, JR

BY
ATTORNEY 3,561,310

CUTTING AND FORMING APPARATUS

BACKGROUND OF THE INVENTION

1. Field of Invention

The present invention relates to cutting devices and more particularly concerns a cutting apparatus which is capable of adjustment so as to impart a variety of contours to the surfaces of the objects to be cut.

2. Description of the Prior Art

A wide variety of industries employ a number of methods and devices to carve objects from machinable but difficultly formable stock materials. When the object is to be provided with a curved or irregular surface, important impediments to economic and efficient production arise. For example, if a dish-shaped article is to be formed from graphite, a sufficiently large block of the material must be slowly machined until the desired shape is achieved. Much waste of material and time is encountered with this type of process; nevertheless, because a suitable substitute is generally unavailable, this tedious, expensive manner of manufacture is continuously carried out in all applicable industries.

SUMMARY OF THE INVENTION

In accordance with the present invention, there is provided an apparatus with an adjustable cutting device, the shape of which may be varied to conform to the configuration which is desired in the article to be produced. The preferred embodiment of the apparatus of the invention includes a bandsaw as the cutting device and further includes a guide member fitted around at least a portion of the bandsaw to function as a passageway through which the bandsaw passes during the operation of the equipment. The guide member is fabricated with a flexible material so that it is readily formed into a desired shape prior to the cutting operation, thus providing an irregular route for the bandsaw. In this manner, the shape of the guide member is transmitted by means of the bandsaw to the object which is cut thereby.

By using the apparatus of the invention the primary object of eliminating the accumulation of superfluous material during the manufacturing process is achieved since by presetting the desired shape on the cutting device itself wasteful machining is rendered unneccessary. Furthermore, a properly contoured article is quickly produced.

The invention will be more readily understood by referring to the drawing, wherein.

DESCRIPTION OF THE PREFERRED EMBODIMENT

Figures 1, 2, 3:
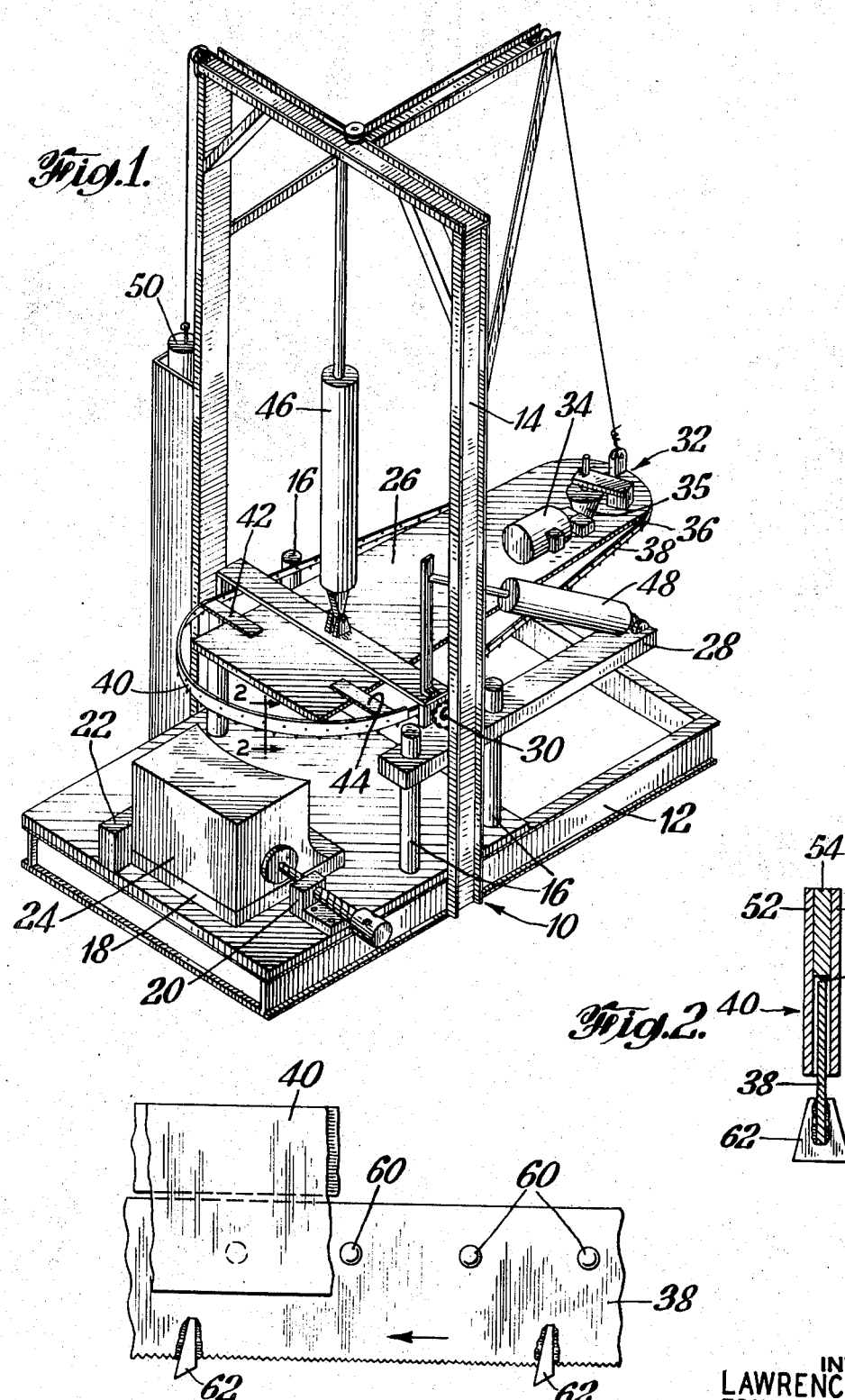
FIG. 1 is a perspective view of an apparatus typical of the invention.
FIG. 2 is an enlarged sectional view in cross section taken along lines 2—2 of FIG. 1.
FIG. 3 is an enlarged side elevation view of a part of the guide member and bandsaw illustrated in FIG. 1.

In FIG. 1 there is illustrated a cutting apparatus 10 comprising a base 12 to which is secured a frame 14, vertical guidepost 16, block support 18, clamping means 20, and a stop guide 22. A block 24 is positioned on the block support 18 and is fastened between clamping means 20 and stop guide 22. A platform 26 is movably secured to the beam support 28 at pivot joints such as that designated by the numeral 30. As illustrated, the beam support 28 is secured to the vertical guideposts 16 and is supported thereby. Mounted on the platform 26 is a driving means which is designated generally by the numeral 32 and which includes a motor 34 and a sprocket wheel 36 and means 35 for translating the rotation of the motor to the sprocket wheel. A bandsaw 38 is positioned about the periphery of the platform 26 and engages the spokes of the sprocket wheel 36. A guide member 40 which is secured to the platform 26 by lateral supports 42, 44 encloses at least a part of the bandsaw 38. Cylinders 46, 48 serve to lower and tilt the platform 26 (and therefore the bandsaw 38) during the operation so that the bandsaw can contact and cut into the block 24. A counterweight 50 may be employed to balance the action of the cylinders 46, 48.

Prior to operation of the apparatus, the guide member 40 is formed into a desired shape. In FIG. 1 it is illustrated as a semicircle having a radius which is much larger than the radius of the bandsaw 38 in the area of the sprocket wheel 36. The guide member may be shaped so that it is characterized by several radii or even an "S" configuration.

After shaping the guide member and positioning the block 24 on the support 18 which is directly below the guided edge of the bandsaw, driving means 32 is actuated. Sprocket wheel 36 is then driven by the motor 34 and causes the bandsaw 38 to rotate. Cylinders 46 and 48 tilt and lower the platform 26 until the rotating bandsaw has cut through the block of material 24. The guide member 40, being secured to the platform, is lowered therewith and continuously provided a passageway or track for the bandsaw blade. In this manner, one side of the block is cut to the shape of the guide member. The block may then be continuously repositioned and repetitive cuts made if so desired to form a number of contoured plates.

FIG. 2 shows the guide member 40 and the bandsaw 38 in greater detail. It is there illustrated that the guide member is preferably constructed by joining together three segments 52, 54, 56 such as by welding, riveting or the like. The joined segments form a passageway or track 58 within which the bandsaw 38 is confined as it rotates.

In FIG. 3, the bandsaw 38 is illustrated as having a plurality of holes 60 and cutting teeth 62. The holes 60 engage the spokes of the sprocket wheel 36 thus enabling the bandsaw to be rotated.

The guide member should be composed of a suitable material which is pliable since its utility is greatly enhanced if it can be reformed for a variety of applications. Of course, a guide member which is to be used in a single application can be moulded into the proper shape from virtually any rigid material. Pliable materials which have been found to be quite acceptable are metals such as spring and/or alloy steels, and plastics such as linen-based Bakelite, Micarta or Formica which can be in a laminated form. The width of the passageway formed by the guide member is partly dependent upon the thickness of the bandsaw which is to pass through it. Generally, a minimum clearance of 0.001 inch on either side of the bandsaw should be provided during operation of the apparatus.

It will be appreciated that a great number of modifications of the apparatus illustrated in the drawing may be made without departing from the scope of the invention. For example, the bandsaw may remain in a stationary position while the block to be cut is moved toward it. Alternatively, both the block and the bandsaw may move together in vertical and/or horizontal planes so as to vary the curvature of the surface being cut. In addition, the sprocket wheel may be replaced by a pair of pressure drive rollers through which the bandsaw passes and by means of which the bandsaw is caused to rotate. Furthermore, other means for support, rotation, movement, balance and the like are well within the skill of an artisan and suitable equivalents are considered within the purview of this invention.

In order to test the effectiveness of the invention, an apparatus similar to that shown in the drawing was employed to fabricate a number of articles from blocks of graphite. The guide member was composed of spring steel and was constructed with three segments as illustrated in FIG. 2. Segments 52 and 56 were 0.035 inch thick, and segment 54 which represented the width of the passageway 58 was 0.037 inch thick. A standard type bandsaw having a thickness of 0.035 inch and characterized by a plurality of holes each having an approximate diameter of three-sixteenths inch spaced 4 inches apart at their centers was used. The bandsaw, which had a circumference of about 10 feet, was rotated by a 1 H.P.—1,750 r.p.m. motor driven through a gear reducer drive unit. Upon contacting the graphite block, the bandsaw was able to cut through 18 inches in 2 minutes. An entire article having overall dimensions of 18 inches width, 18 inches length and between one-fourth and 2 inches thick having a shape similar to a turtle shell was machined in about 10 minutes using only two cuts. This represented an improvement of about 100 percent in the number of cutting steps required over the normal milling procedure currently used in the art and a reduction of about 200 percent in the time required to complete the article. Similar tests with other guide member shapes produced similar excellent improvements.

The apparatus may be used to fabricate completed products or more frequently, to fashion curved plates and segments which may be used singly or secured together to form finished articles. The finished article, when the material is graphite, has a variety of uses such as molds in the casting, hot pressing or sintering of metals refractory compounds and the like.

We claim:

1. In a cutting apparatus including a cutting device, the improvement which comprises a pliable guide member capable of being formed and reformed into any multiradii shape, said guide member enclosing a part of the cutting device to provide a passageway therefor whereby said cutting device assumes the shape of said guide member, said guide member being positioned proximate the edge of the cutting device which contacts an article to be cut to thereby transfer to said article the shape of said guide member during the operation of the cutting apparatus.

2. A cutting apparatus, comprising in combination:
   1. support means;
   2. a cutting device;
   3. driving means for rotating said cutting device, said driving means being secured to said support means; and
   4. a pliable guide member capable of being formed and reformed into any multiradii shape, said guide member secured to said support means and enclosing at least a part of said cutting device to provide a passageway therefor, whereby said cutting device assumes the shape of said guide member as it passes through said passageway, said guide member being positioned proximate that edge of the cutting device which contacts an article to be cut such that during the operation of said cutting apparatus the assumed shape is impressed on the article to be cut.

3. The apparatus of claim 2 wherein said guide member is composed of a pliable material such that it is capable of being preset into an irregular shape and said cutting device is a bandsaw.

4. The apparatus of claim 3 wherein said driving means comprises a motor, a sprocket wheel and means for translating the rotation of said motor to said sprocket wheel; and wherein said bandsaw is provided with a plurality of openings to engage said sprocket wheel and be driven thereby.

5. A cutting apparatus, comprising in combination:
   1. support means;
   2. a cutting device;
   3. driving means for rotating said cutting device, said driving means being secured to said support means;
   4. pivoting means for tilting and lowering said cutting device, said pivoting means being secured to said support means; and
   5. a pliable guide member capable of being formed and reformed into any desired shape, said guide member secured to said support means and enclosing at least a part of said cutting device to provide a passageway therefor, whereby said cutting device assumes the shape of said guide member as it passes through said passageway, said guide member being positioned proximate that edge of the cutting device which contacts an article to be cut such that during the operation of said cutting apparatus the assumed shaped is impressed on the article being cut.

6. The apparatus of claim 5 wherein said cutting device is a bandsaw and wherein said pliable guide member comprises first, second and third segments, said second segment being positioned between the outer of said segments and at one end thereof, and means for securing said second segment to said first and said third segments, said first and third segments having a height greater than said second segment to thereby form a passageway therebetween.

PO-1050
(5/69)

UNITED STATES PATENT OFFICE
CERTIFICATE OF CORRECTION

Patent No. 3,561,310                    Dated February 9, 1971

Inventor(s) Lawrence M. Deeks and Edward J. Kleber, Jr.

It is certified that error appears in the above-identified patent and that said Letters Patent are hereby corrected as shown below:

In claim 3, cancel "said guide member is composed of a pliable material such that it is capable of being preset into an irregular shape and".

Signed and sealed this 14th day of September 1971.

(SEAL)
Attest:

EDWARD M. FLETCHER, JR.
Attesting Officer

ROBERT GOTTSCHALK
Acting Commissioner of Pate